United States Patent Office 3,231,316
Patented Jan. 25, 1966

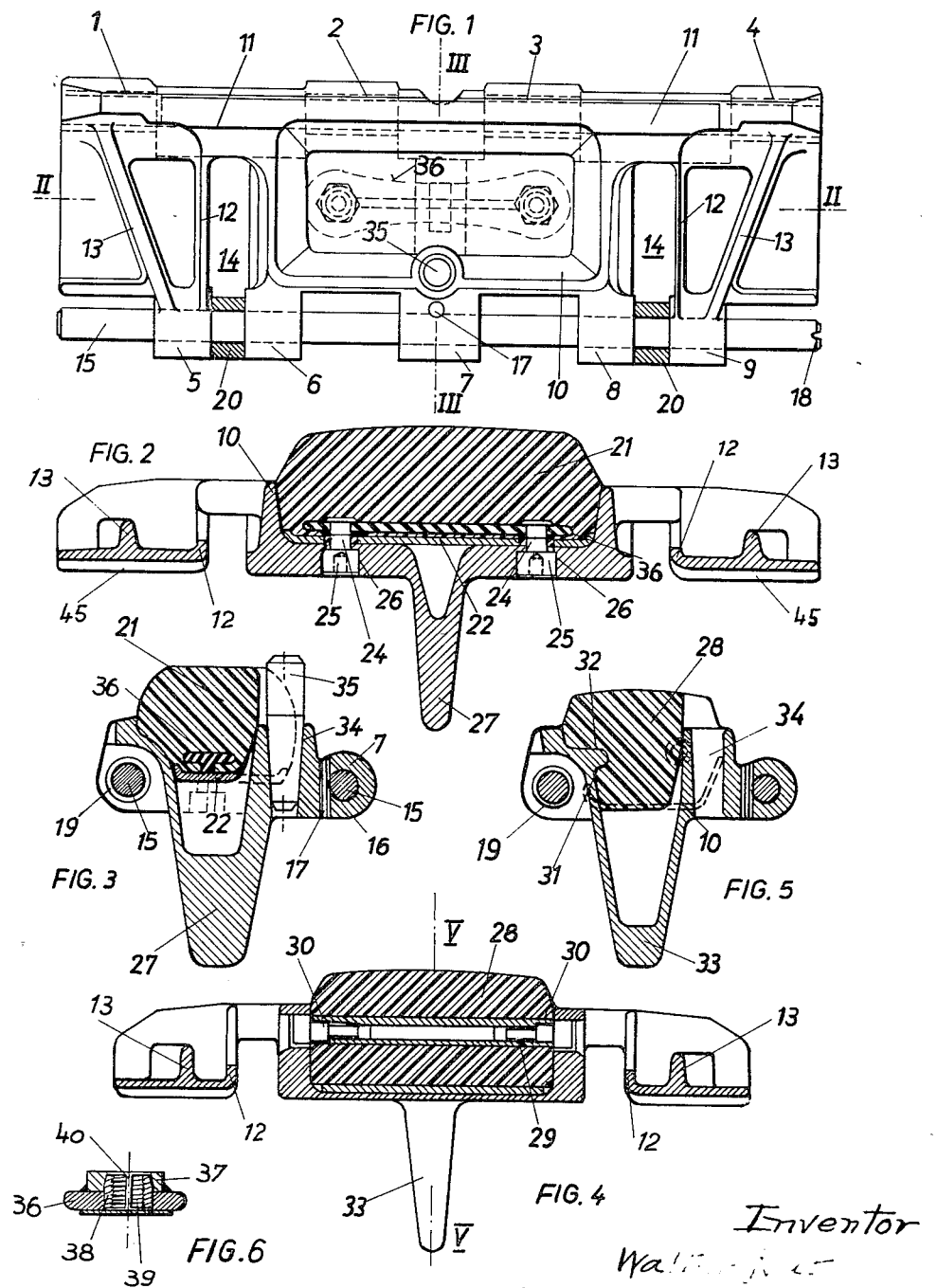

3,231,316
ENDLESS TRACK FOR TRACKED VEHICLES
Walter Ruf, Landhaus am See, Bottighofen,
Thurgau, Switzerland
Filed Dec. 30, 1963, Ser. No. 334,508
Claims priority, application Switzerland, Jan. 5, 1963,
105/63; Germany, Feb. 18, 1963, R 34,487; Feb. 19,
1963, R 34,497; Mar. 8, 1963, R 34,645; Apr. 8, 1963,
R 34,899; Apr. 11, 1963, R 34,935
12 Claims. (Cl. 305—38)

In tracked vehicles, it is generally known to provide endless tracks consisting of a larger number of links which are interconnected by connecting pins. Lubrication of the bearing points between the individual links is very difficult and is usually abandoned for this reason. In consequence, the mounting means of the track links and the connecting pins are subject to considerable wear. This wear causes the gap between the individual links to become larger so that this gap no longer coincides with the toothing of the sprocket wheels driving the track. The gears of the sprocket wheels for driving the endless track also engage into slots of the links. In this manner, owing to the friction between the tooth flanks of the gear rim and the shoulders of the slots, both the track links and the gear rims are subjected to accelerated wear.

Both these factors, namely the increase in the indexing of the track members, caused by the strong wear of the pins forming the articulated joints and the bearings for these pins, and the wear of the teeth of the sprocket wheels and of the shoulder of the track links co-operating with these teeth, result in an inaccurate engagement between toothed rims and track links. The running resistance of the track increases until the track becomes unusable due to wear. In practice, these tracks have a very short useful life, and in view of the fact that these tracks are very expensive, this presents a serious disadvantage.

It is the object of the invention to provide an endless track for tracked vehicles and more particularly for tanks, wherein the expensive metal bodies forming the track links are not subject to wear and may therefore be re-used again and again. The track is therefore regenerable by renewing relatively cheap components, such as the connecting pins, the bearing bushes or the rubber cushions.

It is another object of the invention to provide an endless track which may be used both for peaceful purposes and for fighting vehicles, that is to say, in order to protect the road surfaces, the track is adapted to move on its rubber cushions, while for cross-country running, corresponding webs provided on the metal members forming the endless track make contact with the soil, slush, or the like.

It is another object of the invention to prevent the sliding or skidding of the endless track on ice in that the track may be fitted with metal pegs acting as ice picks, projecting slightly beyond the surfaces of the rubber cushions, forming the running surface.

It is another object of the invention to provide hardened steel rollers on the connecting pins joining the track links, into which engage the the teeth of the sprocket wheels.

It is another object of the invention to provide fixing devices whereby the rubber cushions may be easily and reliably mounted on the track links.

In order to realize the above-mentioned objects, it is proposed according to the invention that:

(1) the connecting pins joining two adjacent track links are non-rotatably located in one of said links, and are located in the other track link in exchangeable bearing bushes of metal or plastic;

(2) rotatable steel rollers are arranged on the said connecting pins at the points of engagement of toothed rims of the sprocket wheels;

(3) the track links are equipped with easily exchangeable rubber cushions;

(4) the track links are equipped with ice picks.

By means of this arrangement, the following is achieved:

(a) that no relative movement, and therefore also no wear occurs between the bearing supports of the one track link and the connecting link; and that the bearing bushes fitted into the bearing bosses of the other track link may be easily exchanged when the permissible amount of wear has been exceeded;

(b) that the arrangement of rollers on the connecting pins reduces wear of the track links and of the toothed rims during the engagement of the gear rims of the sprocket wheels, so that the useful life of these parts is substantially extended;

(c) that, owing to the equipment of the metal members forming the track links with rubber cushions which, after the fitting into the links, are screwed tight either from the side or from the top, according to the construction of the links, optimum cross-country running properties are achieved while the metal members are not damaged when the vehicle is travelling on the road. With the rubber cushions fitted into the metal members, the vehicle is travelling completely on rubber on the road, while during cross-country travel, the rubber cushions are pressed into the soft ground so that the metal surfaces of ribs on the metal members can become effective. Thus, the track according to the present invention is suitable for traveling on the road and cross-country without incurring drawbacks in either case;

(d) that, due to the provision of easily fitted and removed ice picks into holes in the metal members forming the track links, the climbing capabilities of the tracked vehicles in frozen or ice-covered country are maintained and the sliding off of the vehicle is prevented so that also its fighting preparedness is maintained.

The invention will be further described, by way of example, with reference to the accompanying drawings, showing two embodiments of the track links, and in which:

FIG. 1 is a top view of a first embodiment of a track link according to the invention;

FIG. 2 is a cross-section along the line II—II in FIG. 1;

FIG. 3 is a cross-section along the line III—III in FIG. 1;

FIG. 4 is a cross-section of a second embodiment of the track link according to the invention;

FIG. 5 is a cross-section along the line V—V in FIG. 4; and

FIG. 6 is a cross-sectional view of an insertion having the form of a flat dumbbell, for being inserted into the rubber cushion of the embodiment shown in FIGS. 1-3.

The endless track for tracked vehicles which forms the subject matter of the present invention consists of a plurality of track links joined one with the other after the manner of hinges. Each track link is formed by an integrally formed, rectangular metal body. On one long side of this metal body is a first row of bearing bosses 1, 2, 3 and 4. On the other, opposite, long side, there is a second row of bearing bosses 5, 6, 7, 8 and 9. In the center of the metal body is a box-shaped recess 10, having side walls and a base plate. The bearing bosses 2 and 3 are connected with one wall of the recess 10, and the bearing bosses 6, 7 and 8 with the opposite wall. The bearing bosses 1 and 4 are joined by ribs 11 to the bearing bosses 2 and 3 and with the walls of the recess 10. The bearing bosses 5 and 9 are each held by a web 12, extending in the direction of running of the track and by a web 13, extending obliquely to the direction of running of the track, wherein the web 12 is connected with rib 11 and wherein web 13 is connected with bearing bosses 1 or 4. Between the webs 12 and the side walls of the recess 10 there is always a slot 14 into which may engage the teeth (not shown) of two spaced sprocket wheels for driving the endless track.

Each track link is connected articulately with the adjacent link by means of a connecting pin 15. The diameter of this connecting pin 15 corresponds to the inner diameter of the bearing bosses 5, 6, 8 and 9. In its center, the connecting pin 15 has a flattened portion 16. The bearing boss 7 has a bore adapted to receive a locking pin 17 which rests, in the assembled position, against the flattened portion of the connecting pin 15. One end face of the connecting pin 15 is slotted at 18 and adapted to receive a screw-driver. This enables the connecting pin 15 to be rotated into such a position that the locking pin 17 may be pushed into its bore. This locking pin 17 also secures the connecting pin 15 against axial displacement and thus against accidental loss.

The bearing bosses 5 and 6 are aligned with the space intermediate the bearing bosses 1 and 2. The bearing boss 2 is aligned with the space intermediate the bearing bosses 6 and 7. The bearing boss 3 is aligned with the space intermediate the bearing bosses 7 and 8, and the bearing bosses 8 and 9 are aligned with the space intermediate the bearing bosses 3 and 4. Accordingly, the bearing bosses of the adjacent track link always engage between the bearing bosses of the preceding track link. Since the connecting pin 15 is prevented from rotating in the bearing bosses 5, 6, 8 and 9, wear, and thus also an enlargement of the bearing bosses, cannot occur. The inner diameters of the bearing bosses 1, 2, 3 and 4 are slightly oversize relative to the diameter of the connecting pin 15. Replaceable bearing bushes 19 of metal or synthetic resin are fitted into these bearing bosses 1, 2, 3 and 4, in which the connecting pin 15 is free to rotate. Thus, merely the replaceable bearing bushes are subject to wear and the expensive cast or forged metal body is protected.

During the assembly of the connecting pin 15 into the bearing bushes hardened steel rollers 20 are fitted between the bearing bosses 5 and 6, and between the bearing bosses 8 and 9. The teeth of the sprocket wheels, engaging into the slots 14 rest therefore against these hardened steel rollers 20 so that wear is restricted to these replaceable steel rollers without affecting the expensive metal body.

A rubber cushion is fitted into the recess 10. According to the individual design, this rubber cushion may be fixed through the base plate of the recess 10 or through the side walls of the recesss 10.

In the embodiment shown in FIGURES 2 and 3 which is preferred for forged metal elements, a rubber cushion 21 has on its underside a metal plate 22 joined by vulcanizing. An insertion 36 having the form of a flat dumbbell is provided within said rubber cushion, the insertion 36 having at least two threaded bores 38 for receiving fastening screws 24 having socket heads 25. The screws 24 are screwed through appropriate bores in the base plate of the recess 10 and in the metal plate 22 into said bores 38 of the insertion 36. Each of the threaded bores 38 is formed by a longitudinally slotted conical thread sleeve 39 fitting in a conical aperture of the insertion 36, so that the screw connection provided by the screws 24 is self-locking due to the locking action of the slotted conical thread sleeve 39. When the screws 24 are fully screwed in, the heads 25 will be located in recesses 26 of the base plate.

On the side remote from the rubber cushion 21, the metal body has a sprocket tooth 27 against which rest guide rollers guiding the endless track.

In the embodiment shown in FIGURES 4 and 5, preferred for cast metal elements, a rubber cushion 28 is fixed by means of a tube 29 vulcanized into the rubber cushion and extending perpendicularly to the direction of running of the track and having threads at its ends. Instead of this tube 29, threaded bushes may be fixed by vulcanizing into the rubber cushion 28. Screws 30 are located in bores provided in the side walls of the recess 10 and engage into said threads. In addition, the recess 10 has a lug 31 which engages into a correspondingly formed groove 32 of the rubber body 28. This lug 31 absorbs the major part of the forces during stresses of the rubber cushion 28. The screws 30 have only the object of securing the rubber cushion 28 against being pivoted about the lug 31.

Also here, the recess 10 is extended to form a sprocket tooth 33 serving to guide the track along the guide rollers.

Between the bearing boss 7 and the recess 10, there is also provided a conical bore 34 adapted to receive a metal stud 35 serving as ice pick. This metal stud 35 protrudes slightly beyond the surface of the rubber cushion 21 or of the rubber cushion 28. When traveling over ice, such a stud 35 may be fitted, for example, into every fifth track link. These metal studs prevent the track from slipping on the ice and secure thereby the vehicle. For traveling over ordinary surfaces, the metal studs 35 may be knocked out easily by means of a punch from the other side of the hole 34 as shown in FIGS. 1 and 3.

During traveling on road surfaces, only the surface of the rubber cushion 21 or of the rubber cushion 28 makes contact with the road surface. However, when the vehicle travels over soft ground, the rubber cushion 21 or 28, respectively, sinks into the ground; the webs 12 and 13 come into contact with the soil and result in a corresponding increase in the tractive force of the track and in improved safety against slipping.

The track link according to the present invention is thus fully renewable in all parts which are subject to wear, that is to say, in the connecting pins 15, the bearing bushes 19, the steel rollers 20 and the rubber cushions 21 and 28, respectively, while the heavy and expensive metal body is protected and its useful life considerably extended.

The undersides of the webs 12 and 13 are forming a curved surface 45 for engaging the guide rollers of the track, thereby providing a substantially smoother running movement thereof.

Having thus fully disclosed my invention, what I claim and desire to secure by Letters Patent is:

1. An endless track for tracked vehicles, comprising a plurality of integrally formed, rectangular metal bodies, one row of integrally formed bearing bosses formed on the opposite long sides of the metal body, at least one bearing bush in each bearing boss of the one row, one connecting pin located non-rotatably in the bearing bosses of the other row and rotating in the bearing bosses of the adjacent track link, a recess with side walls and a base plate in each metal body, extending between the two rows of bearing bosses but only over a part of the width of the endless track, a rubber cushion in the recess, projecting beyond the surface of the metal body, a metal plate attached by vulcanizing to the underside of the rubber cushion, an insertion having the form of a flat dumbbell within said rubber cushion, at least two threaded bores spaced apart in said insertion, holes in the base plate and in said metal plate attached to said rubber cushion, threaded studs extending through said holes in the base plate and in the metal plate attached to the rubber cushion, engaging into the threaded bores of the insertion.

2. An endless track as claimed in claim 1, comprising sunk depressions in the base plate of the recess on either side of the sprocket tooth, and wherein there are provided two screws engaging into the threaded bores of said flat dumbbell shaped insertion, the heads of said screws being socket heads which are located in said sunk depressions, when the screws are fully screwed home.

3. An endless track as claimed in claim 1, wherein the threaded bores of said insertion are formed each by a slotted conical threaded sleeve fitting in a conical aperture of said insertion, so that the screw connection provided by the screws screwed into said threaded bores is self-locking due to the action of the slotted conical threaded sleeve.

4. A continuous track for tracked vehicles comprising a plurality of metal track links, each connected to an adjacent link; a first row of bearing bosses defined at one edge of each of said links; a second row of bearing bosses defined at the other edge of each of said links, said first row of bearing bosses axially aligned with said second row of bearing bosses of an adjacent link; a connecting pin inserted through said aligned bearing bosses to connect said links; means securing said connecting pin in a fixed relation in said first row of bearing bosses, removable bearing members located in the bearing bosses of said second row and surrounding said pin, two removable steel rollers fitted between two adjacent bearing bosses of one of said rows, and adapted to be engaged by the teeth of a sprocket wheel of a tracked vehicle, a recess defined in the surface of said links remote from said sprocket wheel and extending between said two rows of bearing bosses, but only over a part of the width of said track, a metal plate located in the bottom of said recess, a removable elastic cushion located on said metal plate in said recess and projecting beyond the surface of said link, and means securing said cushion to said link.

5. A continuous track for tracked vehicles comprising a plurality of metal track links, each connected to an adjacent link; a first row of bearing bosses defined at one edge of each of said links; a second row of bearing bosses defined at the other edge of each of said links; said first row of bearing bosses axially aligned with said second row of bearing bosses of an adjacent link; a connecting pin having at least one flattened portion and inserted through said aligned bearing bosses to connect said links; means securing said connecting pin in a fixed relation in said first row of bearing bosses, removable bearing members located in the bearing bosses of said second row and surrounding said pin, two removable steel rollers fitted between two adjacent bearing bosses of one of said rows, and adapted to be engaged by the teeth of a sprocket wheel of a tracked vehicle, a recess defined in the surface of said links remote from said sprocket wheel and extending between said two rows of bearing bosses, but only over a part of the width of said track, a metal plate located in the bottom of said recess, a removable elastic cushion located on said metal plate in said recess and projecting beyond the surface of said link, said elastic cushion having a metal plate on the bottom thereof and an insertion therein, said insertion extending substantially the entire length of said cushion and defining at least two threaded bores, a slotted conical threaded sleeve fitted within each of said bores, and fastening means extending through each of said metal plates into said bore and locked within said sleeve to secure said cushion to said link, the heads of said fastening means disposed entirely within the bodies of said metal links.

6. A continuous track for tracked vehicles comprising a plurality of metal track links, each connected to an adjacent link; a first row of bearing bosses defined at one edge of each of said links; a second row of bearing bosses defined at the other edge of each of said links, said first row of bearing bosses axially aligned with said second row of bearing bosses of an adjacent link; a connecting pin inserted through said aligned bearing bosses to connect said links; means securing said connecting pin in a fixed relation in said first row of bearing bosses, removable bearing members located in the bearing bosses of said second row and surrounding said pin, two removable steel rollers fitted between two adjacent bearing bosses of one of said rows, and adapted to be engaged by the teeth of a sprocket wheel of a tracked vehicle, a recess defined in the surface of said links remote from said sprocket wheel and extending between said two rows of bearing bosses, but only over a part of the width of said track, a metal plate located in the bottom of said recess, a lug provided on the side wall of said recess and extending towards the center of each of said track links, a removable elastic cushion located on said metal plate in said recess, projecting beyond the surface of said link, and defining a groove which receives said lug, and means securing said cushion in said recess.

7. A continuous track for tracked vehicles comprising a plurality of metal track links, each connected to an adjacent link; a first row of bearing bosses defined at one edge of each of said links; a second row of bearing bosses defined at the other edge of each of said links, said first row of bearing bosses axially aligned with said second row of bearing bosses of an adjacent link; a connecting pin having at least one flattened portion and inserted through said aligned bearing bosses to connect said links; means securing said connecting pin in a fixed relation in said first row of bearing bosses, removable bearing members located in the bearing bosses of said second row and surrounding said pin, two removable steel rollers fitted between two adjacent bearing bosses of one of said rows, and adapted to be engaged by the teeth of a sprocket wheel of a tracked vehicle, a recess defined in the surface of said links remote from said sprocket wheel and extending between said two rows of bearing bosses, but only over a part of the width of said track, a metal plate located in the bottom of said recess, a lug provided on the side wall of said recess and extending towards the center of each of said track links, a removable elastic cushion located on said metal base plate in said recess, projecting beyond the surface of said link, and defining a groove which receives said lug, a tube located within said cushion and extending perpendicularly to the direction of the running of the track and having threads at its ends, bores defined in the side walls of said recess, and fastening means located in said bores and engaging said threads to secure said cushion in said recess.

8. The device of claim 5 wherein each of said track links contain five bearing bosses in said first row and four bearing bosses in said second row.

9. The device of claim 7 wherein each of said track links contain five bearing bosses in said first row and four bearing bosses in said second row.

10. The device of claim 7 where track link is equipped with a conical insertion hole, and wherein there is provided a conical metal stud adapted to be pushed into said conical hole.

11. An endless track for tracked vehicles, comprising a plurality of integrally formed, rectangular metal bodies, two rows of bearing bosses integrally formed on the two opposite long sides of said metal body, at least one bearing bush in each bearing boss of one row of said bearing bosses, one connecting pin non-rotatably mounted in the bearing bosses of the other row of bearing bosses and rotating in the bearing bosses of the adjacent track link, a recess with side walls and a base plate in the said metal body extending between said two rows of bearing bosses but only over a part of the width of the endless track, webs in the metal body on both sides of the recess and supporting at least one row of bearing bosses, a rubber cushion in said recess projecting over the surface of the metal body and defining a groove in one side portion thereof, at least one inwardly projecting rib provided on and extending along the side wall of said recess and engaged in said groove, a tube located within said cushion and extending perpendicularly to the direction of the running of the track and having threads at its ends, bores defined in the side walls of said recess and fastening means located in said bores and engaging said threads to secure said cushion in said recess.

12. The device of claim 5, wherein the track link is equipped with a conical insertion hole, and wherein there is provided a conical metal stud adapted to be pushed into said conical hole.

(References on following page)

References Cited by the Examiner

UNITED STATES PATENTS

| | | | |
|---|---|---|---|
| 1,341,761 | 6/1920 | Putnam | 305—58 X |
| 2,332,313 | 10/1943 | Galanot | 305—38 |
| 2,392,383 | 1/1946 | Hollenkamp | 305—53 X |
| 2,409,502 | 10/1946 | Leguillon | 305—35 |
| 2,481,727 | 9/1949 | Deffenbaugh | 305—14 |
| 2,686,697 | 8/1954 | Baker | 305—35 |
| 3,017,225 | 1/1962 | Ruf | 305—38 X |
| 3,148,921 | 9/1964 | Batur | 305—52 X |

FOREIGN PATENTS

| | | |
|---|---|---|
| 532,144 | 8/1955 | Italy. |
| 648,007 | 7/1928 | France. |
| 1,143,727 | 2/1963 | Germany. |

BENJAMIN HERSH, *Primary Examiner.*